United States Patent
Priel et al.

(10) Patent No.: US 7,733,117 B1
(45) Date of Patent: Jun. 8, 2010

(54) METHOD FOR PROTECTING A SECURITY REAL TIME CLOCK GENERATOR AND A DEVICE HAVING PROTECTION CAPABILITIES

(75) Inventors: Michael Priel, Herzeliya (IL); Leonid Smolyansky, Or Akiva (IL); Dan Kuzmin, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/942,799

(22) Filed: Nov. 20, 2007

(51) Int. Cl.
*H03K 19/00* (2006.01)
*G06F 11/30* (2006.01)

(52) U.S. Cl. .............................. 326/8; 713/193; 713/194

(58) Field of Classification Search ...................... 326/8; 713/193, 194; 711/163, 164; 710/200
See application file for complete search history.

(56) References Cited

U.S. PATENT DOCUMENTS

| 5,920,727 | A | 7/1999 | Kikinis et al. |
| 2002/0083284 | A1 | 6/2002 | Matsubara et al. |
| 2004/0128528 | A1 | 7/2004 | Poisner |
| 2004/0225439 | A1 | 11/2004 | Gronemeyer |
| 2006/0007616 | A1 | 1/2006 | Pan et al. |
| 2007/0268059 | A1* | 11/2007 | Sakaguchi et al. .......... 327/333 |

FOREIGN PATENT DOCUMENTS

EP      150480 B1     12/1984

* cited by examiner

*Primary Examiner*—James H. Cho
*Assistant Examiner*—Thienvu V Tran

(57) ABSTRACT

A device having protection capabilities, the device includes a voltage supply unit that is connected to an integrated circuit and provides a supply voltage to the integrated circuit; wherein the integrated circuit includes: a security real time clock generator that includes an input; a masking unit that is connected to the input, wherein the masking unit isolates the input when a voltage supply monitor is disabled; and wherein the voltage supply monitor monitors the voltage supply unit and wherein a change in a level of supply voltage affects a level of a signal provided to the input.

14 Claims, 3 Drawing Sheets

10

METHOD FOR PROTECTING A SECURITY REAL TIME CLOCK GENERATOR AND A DEVICE HAVING PROTECTION CAPABILITIES

FIELD OF THE INVENTION

The present invention relates to methods for protecting a security real time clock generator and for a device having protection capabilities.

BACKGROUND OF THE INVENTION

Real time clock generators have various applications. They can be used for providing timing information for operating systems, for enforcing policies for time-sensitive data, for assisting in positioning calculations and the like. U.S patent application serial number 2002/0083284 of Matsubara et al., titled "Data reproduction system, data recorder and data reader preventing fraudulent usage by monitoring reproducible time limit", U.S. Pat. No. 5,920,727 of Kikinis et al., titled "Timer-controlled computer system shutdown and startup", U.S patent application serial number 2004/0128528 of Poisner titled "Trusted real time clock" and U.S patent application serial number 2004/0225439 of Gronemeyer, titled "Method and apparatus for real time clock (RTC) brownout detection, all being incorporated herein by reference, illustrate some usages of real time clocks.

Real time clock signals can be tampered for various reasons including copyrighting piracy, concealing hacking or tampering attempts, reducing the functionality of a device and the like.

One tampering method involves repetitive alterations of the supply voltage level provided to the real time clock generator, in order to force the real time clock generator to reset or to get stuck.

The supply voltage can be provided by a so-called "external" voltage supply unit—a voltage supply unit that is located outside an integrated circuit that includes the real time clock.

Monitoring of these external voltage supply units can be power consuming and during low power modes the monitoring should be stopped.

There is a need to provide efficient methods and devices for protecting a real time clock.

SUMMARY OF THE PRESENT INVENTION

A device having protection capabilities, the device includes a voltage supply unit that is connected to an integrated circuit and provides a supply voltage to the integrated circuit. The integrated circuit includes: (i) a security real time clock generator that includes at least one input; (ii) a masking unit connected to the at least one input, wherein the masking unit isolates the input when a voltage supply monitor is disabled. The voltage supply monitor monitors the voltage supply unit. A change in a level of supply voltage affects a level of a signal provided to the input of the real time clock generator.

A method for protecting a security real time clock generator, the method includes: (i) disabling a voltage supply monitor that monitors a voltage supply unit that is connected to an integrated circuit that includes a security real time clock generator; (ii) isolating an input of the security real time clock generator by a masking unit, wherein a change in a level of supply voltage affects a level of a signal provided to the input; (iii) enabling the voltage supply monitor and stopping an isolation of the input.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Embodiments of the present invention illustrated in the accompanying drawings provide a power efficient method and device that can protect a security real time counter from tamper attempts. Tamper attempts are monitored by tracking the supply voltage by a voltage supply monitor. The voltage supply monitor can be shut down during low power mode. This shut down improves the power consumption of the device and allows a utilization of a highly accurate yet a power consuming voltage supply monitor. Thus, the accuracy of the voltage supply monitor is not compromised due to its power consumption during low power mode.

Figure 1:
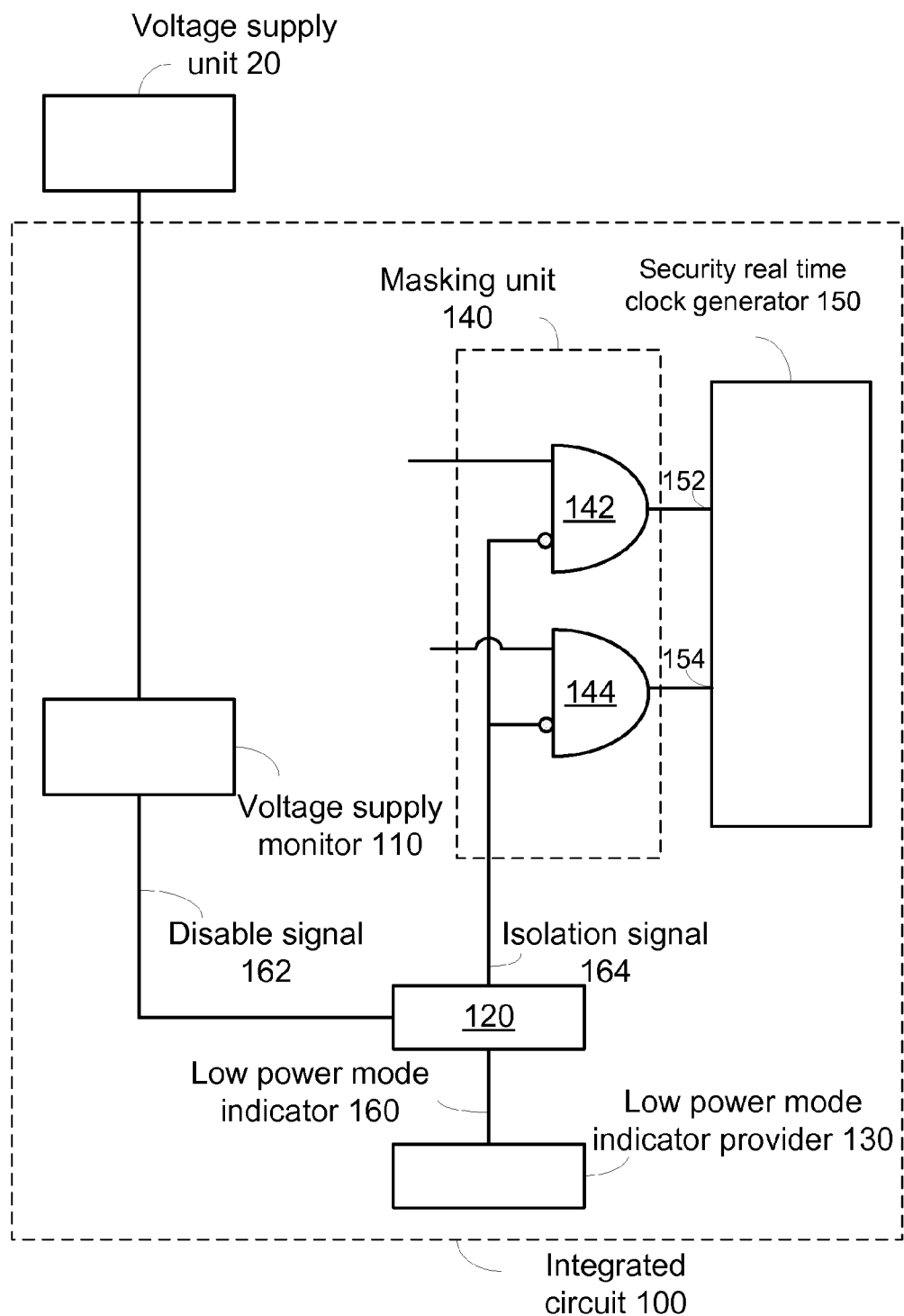
FIG. 1 illustrates a device that has protection capabilities according to an embodiment of the invention.

FIG. 1 illustrates device 10 according to an embodiment of the invention. Device 10 has information (data and/or media) processing capabilities. Device 10 can be a mobile device such as but not limited to laptop computer, a mobile phone, a media player, a mobile game console and the like. Device 10 can also be a stationary apparatus such as a desktop computer, a plasma screen, a television, a media entertainment system, a security/monitoring system, a stationary game console, a network node, a router, a switch, and the like. Device 10 can include one or more displays, processors, memory units, loudspeakers, microphones, DMA controllers, and the like. Device 10 can include multiple integrated circuits.

Device 10 includes voltage supply unit 20 that is connected to integrated circuit 100. Voltage supply unit 20 provides a supply voltage (Vdd 40) to integrated circuit 100.

Integrated circuit 100 includes security real time clock generator 150, masking unit 140, voltage supply monitor 110, circuit 120, and low power mode indicator provider 130.

Voltage supply unit 20 can provide a supply voltage that can fluctuate or otherwise change. A change in a level of supply voltage affects a level of a signal provided to each of one or more inputs of security real time clock generator 150.

Security real time clock generator 150 can include a counter as well secured circuits that can detect tampering of a clock signal provided to the counter, can store keys and the like.

FIG. 1 illustrates security real time clock generator 150 as including two inputs—inputs 152 and 154. It is noted that a security real time clock generator can include a single input or more than two inputs.

Masking unit 140 is connected to inputs 152 and 154 and is able to isolate (mask) inputs 152 and 154 when voltage supply monitor 110 is disabled. Thus, when the voltage supply (Vdd 40) is not monitored signals that are provided to inputs 152 and 154 do not pass through masking unit 140.

If security real time clock generator 150 includes multiple inputs these inputs can be grouped into groups and each input of the group of inputs is connected to the masking unit. Conveniently, each input is connected to a dedicated logic gate.

Typically, voltage supply monitor 110 is disabled when integrated circuit 100 enters a low power mode. Voltage supply monitor 110 is usually very accurate and consumes relatively high power. It typically includes analog circuits that can consume a considerable amount of power.

Highly accurate voltage supply monitors can detect in advance voltage supply drops and enable integrated circuit 100 to perform power failure recovery procedures.

Low power mode indicator provider 130 can generate low power mode indicator 160. It can apply a differential voltage and frequency scaling (DVFS) algorithm, but this is not necessarily so. It is noted that voltage supply monitor 110 can be disabled for reasons other than entrance to a low power mode. Those of skill in the art will appreciate that the masking unit 140 can isolate one or more inputs of security real time clock generator in response to a disable signal sent to voltage supply monitor 110, even if the disable signal is generated due to reasons that are not necessarily linked to low power mode.

Low power mode indicator 160 is provided to circuit 120. Circuit 120 receives low power mode indicator 160 and in response sends disable signal 162 to voltage supply monitor 110 and isolation signal 164 to masking unit 140.

Masking unit 140 includes logic gates 142 and 144. An input of logic gate 142 is connected to input 152 and an input of logic gate 144 is connected to input 154. The other input of each of logic gates 142 and 144 is connected to circuit 120 in order to selectively receive isolation signal 164.

It is noted that all inputs of security real time clock generator 150 can be masked although only few inputs can be masked.

The inputs of security real time clock generator 150 can include commands inputs that can receive various commands, such as disable command. Enable command, read secure key command, and the like. For example, input 152 can be adapted to receive an instruction to read a value of the security real time clock generator. Input 154 can receive a security key. Conveniently, the security key includes multiple bits and each bit can be provided via a dedicated input.

The type of logic cages in masking unit 140 is designed according to the level of isolation signal 164 that should cause an isolation of input signals. For example, if a high level (or "1") isolation signal 164 should trigger the masking then the logic gate can be a combination of an inverter and a AND gate. In such a case the logic gate can be a NAND gate and the input signal can be passed through an inverter. FIG. 1 illustrates logic gates 142 and 144 that are AND gates, each AND gate includes an inverting input that receives isolation signal 164 such that when isolation signal is "high" the masking unit masks the input signals.

According to an embodiment of the invention masking unit 140 masks signals not only in response to low power mode indicator 160 but also in response to low power detection signal provided from voltage supply monitor 110.

Figure 2:
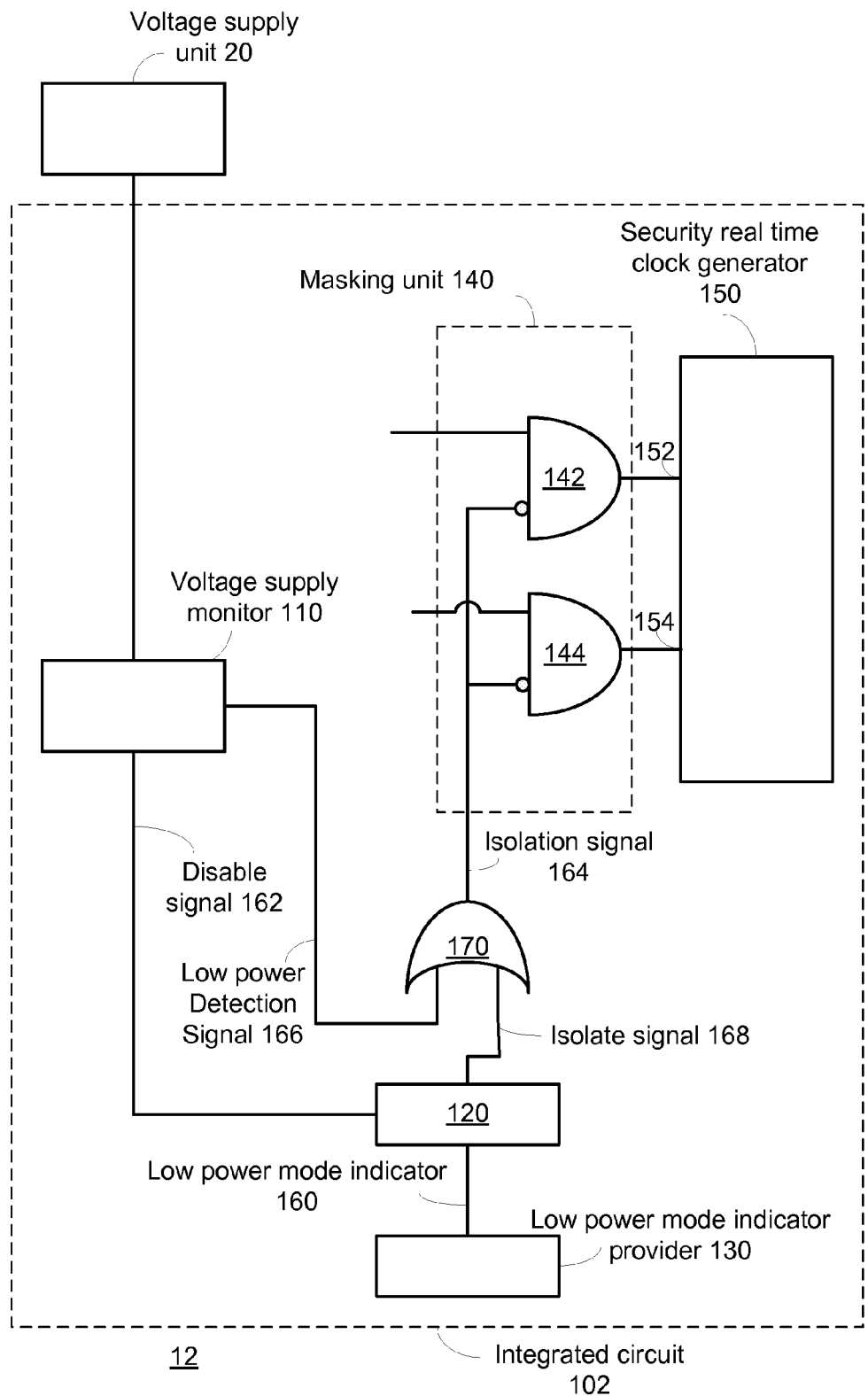
FIG. 2 illustrates a device that has protection capabilities according to another embodiment of the invention.

FIG. 2 illustrates device 12 according to another embodiment of the invention. Device 12 differs from device 10 of FIG. 1 (and integrated circuit 102 of FIG. 2 differs from integrated circuit 100 of FIG. 1) by including logic gate 170 that can receive as inputs isolate signal 168 (from circuit 120) and low power detection signal 166 (from supply voltage monitor 110). Logic gate 170 performs an OR operation to provide isolation signal 164 to masking unit 140. Thus, if circuit 120 indicates that the supply voltage monitor is going to be disabled or if the supply voltage monitor 110 indicates that the supply voltage is low then the masking unit is activated.

Figure 3:
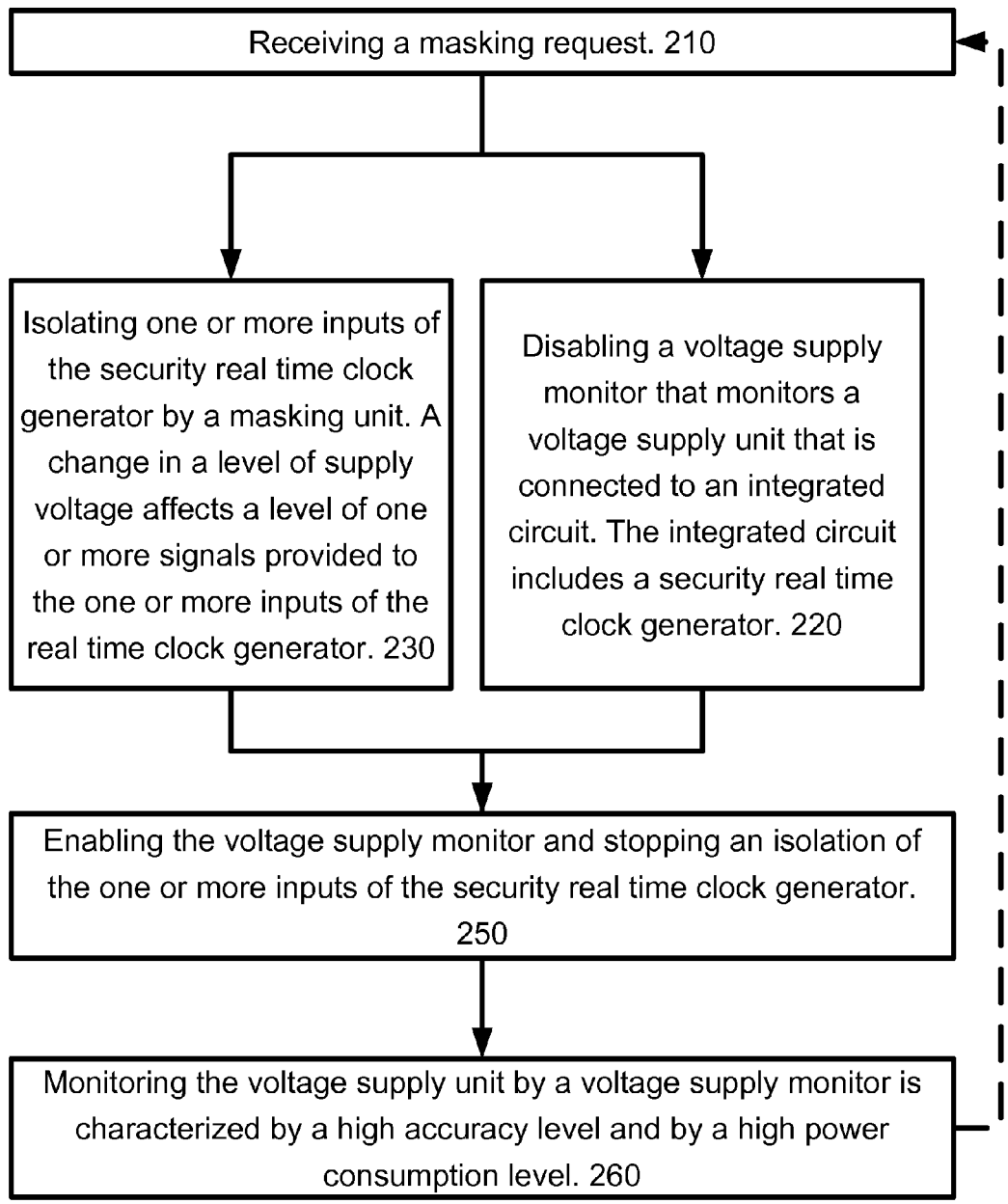
FIG. 3 illustrates a method for protecting a real time clock generator according to another embodiment of the invention.

FIG. 3 illustrates method 200 for protecting a real time clock generator according to another embodiment of the invention.

Method 200 starts by stage 210 of receiving a masking request. The masking request can be a low power mode indicator, a voltage supply monitor disable request, an indication that the supply voltage is low. Stage 210 is followed by stages 220 and 230.

Stage 210 can include receiving the low power mode indicator from a dynamic voltage and frequency scaling controller.

Stage 220 includes disabling a voltage supply monitor that monitors a voltage supply unit that is connected to an integrated circuit. The integrated circuit includes a security real time clock generator.

Stage 230 includes isolating one or more inputs of the security real time clock generator by a masking unit. A change in a level of supply voltage affects a level of one or more signals provided to the one or more inputs of the real time clock generator.

Stage 230 conveniently includes providing an isolation signal to an input of a logic gate that belongs to the masking unit. Another input of the logic gate is connected to the input.

Stage 220 and 230 are followed by stage 250 of enabling the voltage supply monitor and stopping an isolation of the one or more inputs of the security real time clock generator.

Stage 250 is followed by stage 260 of monitoring the voltage supply unit by a voltage supply monitor is characterized by a high accuracy level and by a high power consumption level. Stage 260 can be followed by stage 210.

Method 200 can also include receiving an instruction to read a value of the security real time clock generator via the input. If the request is received while the masking unit isolates the input then the request is masked by the masking unit.

Method 200 can also include receiving a security key via the input. If the request is received while the masking unit isolates the input then the request is masked by the masking unit.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having protection capabilities, the device comprises a voltage supply unit that is coupled to an integrated circuit and provides a supply voltage to the integrated circuit;
   wherein the integrated circuit comprises:
   a security real time clock generator that comprises an input;
   a masking unit coupled to the input, wherein the masking unit isolates the input when a voltage supply monitor is disabled; and
   wherein the voltage supply monitor monitors the voltage supply unit and wherein a chance in a level of supply voltage affects a level of a signal provided to the input;
   wherein the device further comprises a circuit that is adapted to receive a low power mode indicator and in response to disable the voltage supply monitor and send an isolation signal to the masking unit.

2. The device according to claim 1 wherein the voltage supply monitor is characterized by a high accuracy level and by a high power consumption level.

3. The device according to claim 1 wherein the masking unit comprises a logic gate; wherein one input of the logic gate is coupled to the input and another input of the logic gate is coupled a control circuit such as to selectively receive an isolation signal.

4. The device according to claim 1 wherein the input is adapted to receive an instruction to read a value of the security real time clock generator.

5. The device according to claim 1 wherein the input is adapted to receive a security key.

6. The device according to claim 1 wherein the security real time clock generator comprises a group of inputs, each input of the group of inputs is coupled to the masking unit.

7. The device according to claim 6 wherein each input of the group of inputs is coupled to a logic gate of the masking unit.

8. A device having protection capabilities, the device comprises a voltage supply unit that is coupled to an integrated circuit and provides a supply voltage to the integrated circuit;
   wherein the integrated circuit comprises:
   a security real time clock generator that comprises an input;
   a masking unit coupled to the input, wherein the masking unit isolates the input when a voltage supply monitor is disabled; and
   wherein the voltage supply monitor monitors the voltage supply unit and wherein a chance in a level of supply voltage affects a level of a signal provided to the input;
   wherein the device further comprises a circuit that is adapted to receive a low power mode indicator and in response to disable the voltage supply monitor and send an isolation signal to the masking unit, and a dynamic voltage and frequency scaling controller that is adapted to generate the low power mode indicator.

9. The device according to claim 8, wherein the voltage supply monitor is characterized by a high accuracy level and by a high power consumption level.

10. The device according to claim 8, wherein the masking unit comprises a logic gate; wherein one input of the logic gate is coupled to the input and another input of the logic gate is coupled a control circuit such as to selectively receive an isolation signal.

11. The device according to claim 8, wherein the input is adapted to receive an instruction to read a value of the security real time clock generator.

12. The device according to claim 8, wherein the input is adapted to receive a security key.

13. The device according to claim 8, wherein the security real time clock generator comprises a group of inputs each input of the group of inputs is coupled to the masking unit.

14. The device according to claim 13 wherein each input of the group of inputs is coupled to a logic gate of the masking unit.

\* \* \* \* \*